United States Patent [19]
Zahner

[11] 3,763,674
[45] Oct. 9, 1973

[54] WHEEL LOCK

[76] Inventor: Bruce M. Zahner, 1913 Monoviz Ave., Costa Mesa, Calif. 92627

[22] Filed: June 16, 1971

[21] Appl. No.: 153,676

[52] U.S. Cl. .................................................. 70/226
[51] Int. Cl. ......................... B60r 25/00, B62h 5/14
[58] Field of Search ................ 70/225–227, 233, 236

[56] References Cited
UNITED STATES PATENTS

| 1,305,563 | 6/1919 | Poland | 70/226 |
| 925,810 | 6/1909 | Hopping | 70/226 |
| 1,307,161 | 6/1919 | Stubblefield | 70/226 |
| 1,400,415 | 12/1921 | Callahan | 70/236 |

Primary Examiner—Joseph H. McGlynn
Attorney—Newton H. Lee, Jr.

[57] ABSTRACT

A wheel lock wherein a lock bar has a stem with an eye on one end and a retainer arm on the other end extending at a right angle from the stem, the stem extends through an opening in a wheel hub and the retainer arm is located at the inboard side of the hub, a lock bail extends through the wheel axle and through the eye of the lock bar.

7 Claims, 8 Drawing Figures

PATENTED OCT 9 1973 3,763,674
SHEET 1 OF 2
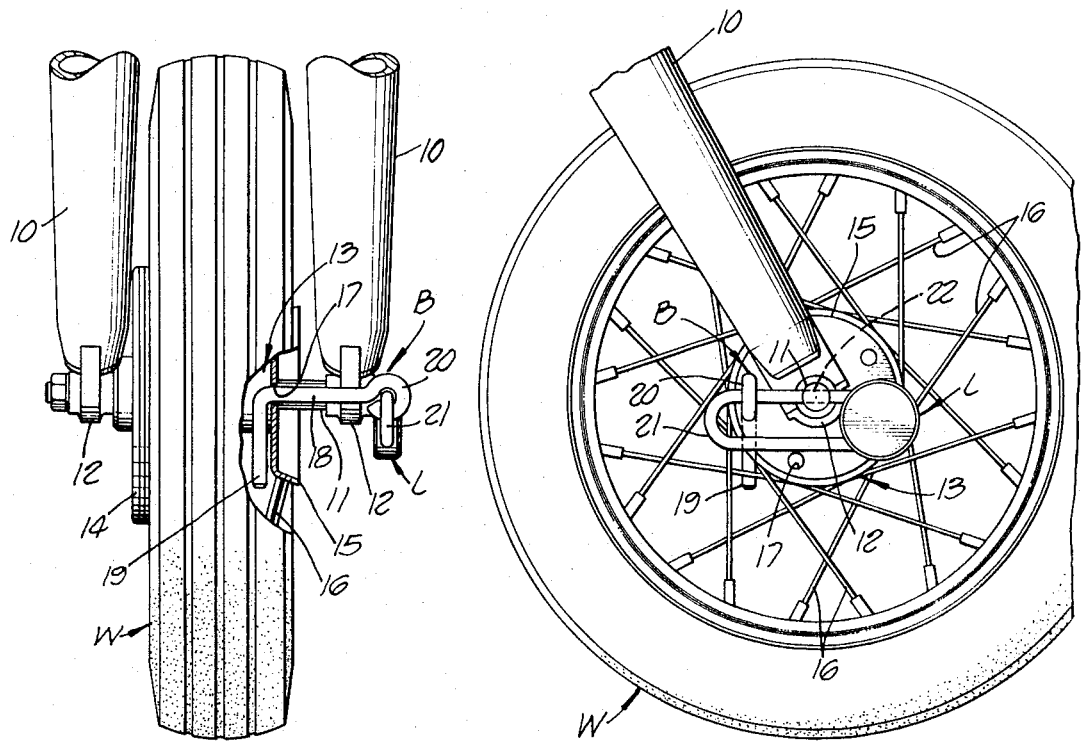
FIG. 1.   FIG. 2.
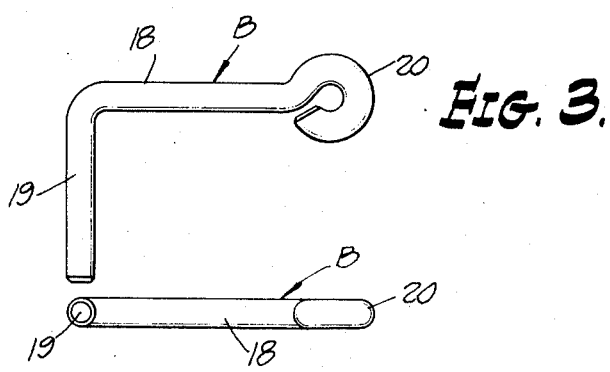
FIG. 3.
FIG. 4.
INVENTOR
BRUCE M. ZAHNER
BY Newton H. Lee, Jr.

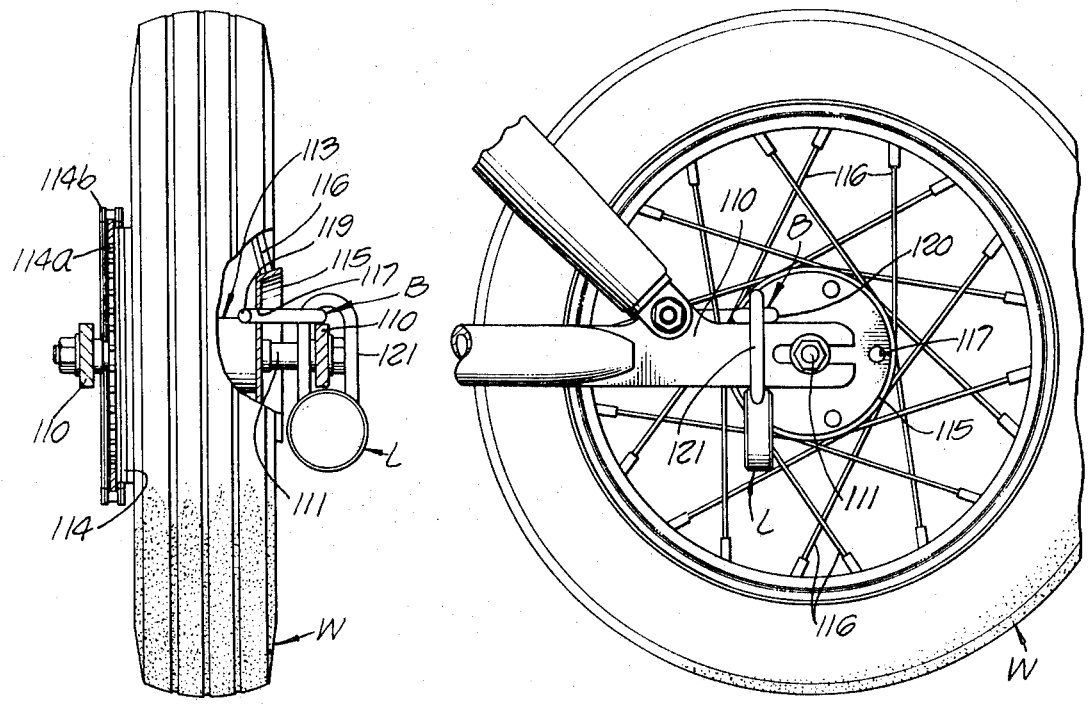
FIG. 5.   FIG. 6.
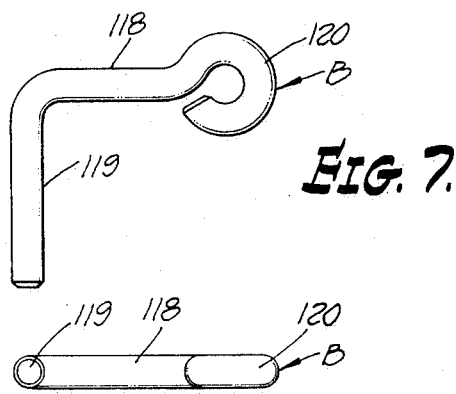
FIG. 7.
FIG. 8.
INVENTOR
BRUCE M. ZAHNER
BY Newton N. Lee, Jr.

WHEEL LOCK

BACKGROUND OF THE INVENTION

Motorcycling in recent years has been increasing in popularity so that there exists a large number of motorcycles, the owners of which use their motorcycle for general transportation and/or pleasure or sport. Thus, parking lots may at any given time have a considerable number of motorcycles parked thereoon. In addition, motorcyclists, from time to time, gather at special events, so that large numbers of motorcycles may be parked in a group.

As the popularity of motorcycles increases and the number of motorcycles parked on lots or at special events increases, the hazard of unauthorized use or theft has also increased. Typically, the safety features of a motorcycle adapted to prevent unauthorized use or theft have comprised a key operated locking pin which is engaged in an opening in the front wheel steering post to lock the front wheel at an angle to the frame, as well as a key locked ignition switch for the engine. Neither of such conventional locking means is satisfactory, in that the steering post lock pin can be sheared by forcing the handle bars to the center position, and the lock on the ignition system may be manually broken or the switch by-passed.

Thus, another conventional mode of locking motorcycles has involved the use of a length of chain which can be used in combination with a lock to secure the motorcycle to a post or other fixed element or to lock a wheel of the motorcycle to the frame. Such claims are not wholly satisfactory, however, since they can usually be cut.

SUMMARY OF THE INVENTION

The present invention involves a novel and rugged locking device by which the wheel of a motorcycle, or the like, can be locked against rotation, so that even in the event that the customary locking devices, such as the steering post lock and the ignition switch lock, are not in use or are overcome, the vehicle is nevertheless locked against rolling and therefore comparatively safe from theft or unauthorized use.

More particularly, the invention provides a lock bar, used in combination with a lock to lock a wheel against rotation in a novel manner, the lock bar being secured to a stationary portion of the vehicle and engaging a portion of the wheel hub, and the lock bar and lock being such that they are not conveniently subject to cutting or other destruction.

In accomplishing the foregoing, the lock bar is constructed in such a manner that it has a stem provided at one end with an arm extending at a right angle from the stem and an eye at the other end of the stem. The arm is adapted to be inserted into an opening in a portion of the hub of a wheel and the bar then turned, so that the arm extends behind the hub portion and the stem projects through the opening in the hub portion to dispose the eye at a location at which the bail of a lock is insertable through the eye and the lock closed to connect the lock bar to a stationary portion of the vehicle.

Certain well known motorcycles have wheels, both front and rear, which have hub portions in the form of a pair of discs to which the inner ends of the usual wheel spokes are attached, and which have a number of circumferentially spaced bolt holes adapted to receive bolts for the purpose of securing one of the discs to a brake drum or drive sprocket. Such discs, then, inherently provide at the side of the wheel opposite to the brake drum or sprocket, a number of circumferentially spaced bar, adapted to receive the lock ar, and the vehicle has a portion adapted to accommodate a lock, the bail of which passes through the eye of the lock bar.

In the case of a front wheel lock, the lock bail preferably extends through an opening in the end of the wheel axle; while in the case of a rear wheel lock, the lock bail may engage a portion of the wheel supporting frame. In either case, the wheel is held against rotation. When the lock bar and the lock bail are composed of material that cannot be easily cut, such as spring steel, the motorcycle is, clearly, safe from theft or unauthorized use.

This invention possesses many other advantages, and has other purposes which may be made more clearly apparent from a consideration of forms in which it may be embodied. These forms are shown in the drawings accompanying and forming part of the present specification. They will now be described in detail, for the purpose of illustrating the general principles of the invention; but it is to be understood that such detailed descriptions are not to be taken in a limiting sense, since the scope of the invention is best defined by the appended claims.

BRIEF DESCRIPTION OF THE DRAWINGS

FIG. 1 is a fragmentary view in elevation, with portions broken away to show the application of the wheel lock of the invention to the front wheel of a motorcycle;

FIG. 2 is a fragmentary side elevation of the structure of FIG. 1;

FIG. 3 is an elevation of the lock bar of the invention as used in the front wheel lock of FIGS. 1 and 2;

FIG. 4 is a plan of the lock bar of FIG. 3;

FIG. 5 is a fragmentary view similar to FIG. 1, illustrating the application of the wheel lock of the invention to the rear wheel of a motorcycle;

FIG. 6 is a fragmentary side elevation of the structure of FIG. 5;

FIG. 7 is an elevation of the lock bar of the invention as used in the rear wheel lock of FIGS. 5 and 6; and FIG. 8 is a plan of the lock bar of FIG. 7.

DESCRIPTION OF THE PREFERRED EMBODIMENTS

Referring first to FIGS. 1 through 4, the front wheel W of a motorcycle is shown as being supported between the posts 10, 10 of the usual fork of the vehicle, and rotatable on an axle 11 is secured to the lower ends of the posts 10 by clamps 12 and the axle extends through the hub assembly 13 of the wheel. Included in the hub assembly 13 is the usual brake drum 14.

Certain wheels of motorcycles have a hub assembly like that shown, including a pair of axially spaced discs, one of which is shown at 15, and the other of which, not shown, is connected to the brake drum 14. The wheel spokes 16 are attached at their inner ends to the outer peripheries of the discs 15. These discs 15 are customarily each provided with a number of circumferentially spaced bolt holes adapting each of the discs 15 for connection to the brake drum 14, so that the disc 15 shown in the drawings which is not attached to the brake drum has the bolt holes 17 free to accommodate the wheel locking bar of the invention as generally denoted at B.

This lock bar has an elongated body or stem 18 at one end of which is a retainer arm 19 disposed at a right angle to the stem 18, and at the other end of the stem 18 is formed an eye 20. Preferably, the lock bar 13 is composed of material which is hard to cut, such as spring steel bent to the illustrated or equivalent shape.

In any event, the retainer or arm portion 19 of the lock bar B is adapted to be inserted through a selected bolt hole 17 of the hub disc 15 and the bar is then positioned so that the retainer or arm 19 is disposed on the inboard side of the disc 15 with the stem extending outwardly through the selected bolt hole 17 in substantially parallel relation to the axle 11.

With the lock bar B so positioned, the eye 20 is adapted to receive one side of a bail 21 of a safety lock L which may be of the key or combination type. The bail 21 also extends through a hole 22 in the outer end of the axle 11 so that, when the lock L is closed, as illustrated, the lock bar B is effectively affixed at its eye 20 to the axle 11. Thus, the wheel W is locked by the bar B against rotation about the axle, and the motorcycle is effectively locked against theft or unauthorized use.

In the illustration, the locking means is shown as applied to a front wheel of a typical motorcycle for which certain accessories are available, such as a decorative hub cap (not shown) and an axle end cap (not shown). It will be understood, without need for illustration that the hub cap which is attached to the disc 15 may be provided with an appropriate elongated slot to allow insertion of the lock bar B through such slot and into the disc opening 17. It will also be understood that the axle end cap may be suitably notched to accommodate the lock bail 21.

Referring now to FIGS. 5 through 8, a rear wheel assembly is shown, in which the wheel W is revolvable about the rear axle 111 which is fixed between laterally spaced frame members 110, 110. In this case, the brake drum 114 has a drive sprocket 114a connected thereto for driving engagement by the usual drive chian 114b. The hub 113, as in the previously described embodiment, also includes the hub disc 115 to which the inner ends of the spokes 116 are attached, and the disc 115 has a plurality of circumferentially spaced bolt holes 117, like the holes 17 previously described.

In this embodiment, the lock bar B also has a stem or body 118 provided with a retainer or arm 119 extending at a right angle from one end of the stem and an eye 120 at the other end of the stem. Here, the stem is shorter than in the previously described embodiment, in order to be applicable between the hub disc 115 and a portion of the fixed frame member 110 which are closer than in the front wheel assembly.

With the lock bar inserted through a selected bolt hole 117 of the hub disc 115, so that the retainer or arm 119 is inboard of the disc 115 and the stem extends horizontally into overlying relation to the frame member 110, the bail 121 of the lock L is adapted to extend through the eye 120 of the lock bar and around the frame member 110, so that when the lock 1 is applied the wheel W is effectively locked to the frame member 110 against rotation. Here again the lock bar is preferably composed of spring steel so as to be difficult to cut.

From the foregoing, it is apparent that the present invention provides a novel locking means for the wheels of vehicles, such as motorcycles having a member rotatable with the wheel and providing at least one opening like the openings 17 and 117 to receive a lock bar, and while the hub discs 15 and 115 are typical in certain makes of motorcycles, it is conceivable that other wheels may be adapted to receive the lock bar, if desired.

I claim:

1. In a vehicle wheel lock: a wheel having a member rotatably with the wheel and providing an opening, said vehicle having a stationary portion adjacent to said wheel, a lock bar having a stem, a retainer arm on one end of said stem adapted to be inserted through and removed from said opening said arm being disposed on the inboard side of said member with said stem extending outwardly through and closely fitting in said opening, and a lock having a bail directly interconnected with the outer end of said stem and said stationary portion and locking said lock bar to said stationary portion and holding said wheel against rotation.

2. In a vehicle wheel lock as defined in claim 1, and an eye on the outer end of said stem receiving said lock bail.

3. In a vehicle wheel lock as defined in claim 1, said stationary portion comprising a fixed axle rotatably supporting said member rotatable with the wheel, said axle having an opening therethrough and said bail extending through said opening in said axle.

4. In a vehicle wheel lock as defined in claim 1, said stationary portion comprising a frame member supporting the wheel, and said bail extending about said frame member.

5. In a lock for vehicle wheels, a stationary portion, a wheel having an axle supported by said stationary portion, said wheel having a hub disc provided with a number of openings spaced circumferentially about said axle, a lock bar having a stem and a retainer arm projecting from said stem, said retainer arm being disposed inboard of said hub disc with said stem extending through and closely fitting in one of said openings, and a lock having a bail directly interconnected with the outer end of said stem and with said stationary portion for holding said stem and locking said wheel against rotation.

6. In a lock for vehicle wheels as defined in claim 5, said axle having an opening therethrough, the outer end of said stem having an eye, and said lock having a bail extended through said opening in said axle and said eye.

7. In a lock for vehicle wheels as defined in claim 5, the outer end of said stem having an eye, and said lock having a bail extending about said stationary portion and through said eye.

* * * * *